United States Patent
Agrawal et al.

(10) Patent No.: US 10,977,165 B2
(45) Date of Patent: Apr. 13, 2021

(54) METHOD AND SYSTEM FOR TEST CASE GENERATION FOR EVENT BASED SYSTEMS USING GRAPH PATH TRAVERSAL

(71) Applicant: Tata Consultancy Services Limited, Mumbai (IN)

(72) Inventors: Supriya Agrawal, Pune (IN); Venkatesh Ramanathan, Pune (IN); Ulka Shrotri, Pune (IN); Amey Zare, Pune (IN); Sagar Kumar Verma, Pune (IN)

(73) Assignee: Tate Consultancy Services Limited, Mumbai (IN)

( * ) Notice: Subject to any disclaimer, the term of this patent is extended or adjusted under 35 U.S.C. 154(b) by 0 days.

(21) Appl. No.: 16/828,501

(22) Filed: Mar. 24, 2020

(65) Prior Publication Data

US 2021/0081306 A1 Mar. 18, 2021

(30) Foreign Application Priority Data

Sep. 14, 2019 (IN) .............................. 201921037083

(51) Int. Cl.
| | | |
|---|---|---|
| *G06F 9/44* | (2018.01) | |
| *G06F 11/36* | (2006.01) | |
| *G06F 16/901* | (2019.01) | |
| *G06F 9/448* | (2018.01) | |
| *G06F 8/35* | (2018.01) | |

(52) U.S. Cl.
CPC ............ *G06F 11/3684* (2013.01); *G06F 8/35* (2013.01); *G06F 9/4498* (2018.02); *G06F 11/3604* (2013.01); *G06F 11/3668* (2013.01); *G06F 11/3676* (2013.01); *G06F 11/3688* (2013.01); *G06F 11/3696* (2013.01); *G06F 16/9024* (2019.01)

(58) Field of Classification Search
CPC ............ G06F 11/3644; G06F 11/3604; G06F 21/577; G06F 8/35; G06F 11/3696; G06F 11/3676; G06F 11/3668; G06F 11/3684
See application file for complete search history.

(56) References Cited

U.S. PATENT DOCUMENTS

| | | | |
|---|---|---|---|
| 8,893,087 B2 | 11/2014 | Maddela | |
| 9,329,962 B2 | 5/2016 | Salame | |
| 10,713,151 B1* | 7/2020 | Zinger | ................ G06F 11/3644 |
| 2014/0283080 A1* | 9/2014 | Beskrovny | ............ G06F 21/577 |
| | | | 726/25 |

(Continued)

OTHER PUBLICATIONS

Zhang et al, "Path-oriented test data generation using symbolic execution and constraint solving techniques" SEFM'04, Conference date: Sep. 30, 2004, 10 pg. <Zhang_04.pdf>.*

(Continued)

*Primary Examiner* — Tuan A Vu
(74) *Attorney, Agent, or Firm* — Finnegan, Henderson, Farabow, Garrett & Dunner LLP

(57) ABSTRACT

The present disclosure generates a plurality of time bound test cases based on an Artificial Rain Drop (ARD) algorithm. Here, events associated with an event-based system are compiled in a tabular format. Each of the plurality of events are represented as a regular expression. Further, timed finite automaton is constructed for each regular expression prior to applying the ARD algorithm.

5 Claims, 6 Drawing Sheets

(56) References Cited

U.S. PATENT DOCUMENTS

2015/0082107 A1    3/2015  Joy
2016/0283201 A1*  9/2016  Wang .................. G06F 11/3604

OTHER PUBLICATIONS

Tsai, B-Y. et al. "An Automatic Test Case Generator Derived from State-Based Testing," *Proceedings 1998 Asia Pacific Software Engineering Conference*, Dec. 2-4, 1998, Taipei, Taiwan; 8 pages.

* cited by examiner

METHOD AND SYSTEM FOR TEST CASE GENERATION FOR EVENT BASED SYSTEMS USING GRAPH PATH TRAVERSAL

PRIORITY CLAIM

This U.S. patent application claims priority under 35 U.S.C. § 119 to: India Application No. 201921037083, filed on Sep. 14, 2019. The entire contents of the aforementioned application are incorporated herein by reference.

TECHNICAL FIELD

The disclosure herein generally relates to the field of design testing, and, more particular, to a method and system for test case generation for event based systems using graph path traversal.

BACKGROUND

Product testing is an activity to check whether the actual results of a product are matching with the expected results. Also, testing ensures whether the product is defect free or not and it is an important part of any product before product release. Any inadequacy in testing can result in financial losses and also damage the reputation, brand, and business. Functional testing is important since it verifies that the products functioning meets its requirements.

Conventional methods mainly focus on executing test cases rather than generating test cases. Further, the conventional test case generation methods generate very specific test cases applicable to certain applications. Hence there is challenge to create scalable test cases for products with huge volume of data and with complex features

SUMMARY

Embodiments of the present disclosure present technological improvements as solutions to one or more of the above-mentioned technical problems recognized by the inventors in conventional systems. For example, in one embodiment, a method for test case generation for event based systems using graph path traversal is provided. The method includes receiving, a plurality of input signals and a plurality of output signals of a system under test, represented as a regular expression corresponding to a plurality of events of the system under test in a tabular format, wherein the tabular format includes a plurality of rows. Further, the method includes, creating a plurality of state machines for each of the plurality of regular expressions associated with the tabular format (204). Further, the method includes, initializing generation of a control graph with a first node for the system under test, wherein the graph is grown by adding a node and an edge when there is a change in an input signal among the plurality of input signals of the tabular format, wherein each edge of the graph is associated with the plurality of input signals, a moisture value and a goodness value ($\eta$). Further, the method includes, growing the control graph until the plurality of rows are processed, where growing the control graph includes: (i) selecting an unprocessed row among the plurality of rows as a target row based on a distance, wherein the distance is computed based on a weighted sum of a number of transitions required to reach final state in each of the state machine associated with the target row (ii) computing an input value for each non-empty input signal among the plurality of input signals of the target row by querying the plurality of state machines associated with the target row (iii) computing an initial fitness value for each non-empty input signal, wherein the initial fitness value of each non-empty input signal is associated with a plurality of outgoing edges of a current node of the control graph (iv) computing a final fitness value for each non-empty input signal based on the initial fitness value, timing constraints and dependency constraints associated with each of the non-empty input signal (v) selecting at least one non-local input signal among the plurality of input signals in a probabilistic manner based on the final fitness value, wherein if an input signal among the plurality of input signals is a local input signal, the value of the local input signal is checked for presence in the plurality of output signals of rows other than the target row by recursive backtracking to obtain a non-local input signal (vi) computing a time for the selected non-local input signal based on the timing constraints (vii) executing each state machine of each of the plurality of rows associated with the tabular format based on the value of the selected non-local input signal(s) and the computed time and (viii) updating the control graph by creating a new node and a new edge, with updated input values, the moisture value and the goodness value ($\eta$) associated with the edge, wherein the moisture is updated only if an unprocessed row is processed, and wherein the goodness value ($\eta$) is updated when a target row is processed. Finally, the method includes, generating a plurality of test cases by selecting a plurality of paths, wherein each path among the plurality of paths begins at the first node of the control graph and terminates at a node of the control graph, corresponding to process completion of the target row, wherein each of the plurality of test cases includes a plurality of timed input variable pair and a plurality of timed output variable pair.

In another aspect, a system for test case generation for event based systems using graph path traversal is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a plurality of input signals and a plurality of output signals of a system under test, represented as a regular expression corresponding to a plurality of events of the system under test in a tabular format, wherein the tabular format includes a plurality of rows. Further, the one or more hardware processors are configured by the programmed instructions to create a plurality of state machines for each of the plurality of regular expressions associated with the tabular format. Further, the one or more hardware processors are configured by the programmed instructions to initialize generation of a control graph with a first node for the system under test, wherein the graph is grown by adding a node and an edge when there is a change in an input signal among the plurality of input signals of the tabular format, wherein each edge of the graph is associated with the plurality of input signals, a moisture value and a goodness value ($\eta$). Further, the one or more hardware processors are configured by the programmed instructions to grow the control graph until the plurality of rows are processed, where growing the control graph includes: (i) select an unprocessed row among the plurality of rows as a target row based on a distance, wherein the distance is computed based on a weighted sum of a number of transitions required to reach final state in each of the state machine associated with the target row (ii) compute an input value for each non-empty input signal among the plurality of input signals of the target row by querying the plurality of state machines associated with the target row (iii) compute an initial fitness value for each non-empty input signal, wherein the initial fitness value of each non-empty input signal is associated with a plurality of outgoing edges of a current node of the control graph (iv) compute a final fitness value for each non-empty input signal based on the initial fitness value, timing constraints and dependency constraints associated with each of the non-empty input signal (v) select at least one non-local input signal among the plurality of input signals in a probabilistic manner based on the final fitness value, wherein if an input signal among the plurality of input signals is a local input signal, the value of the local input signal is checked for presence in the plurality of output signals of rows other than the target row by recursive backtracking to obtain a non-local input signal (vi) compute a time for the selected non-local input signal based on the timing constraints (vii) execute each state machine of each of the plurality of rows associated with the tabular format based on the value of the selected non-local input signal and the computed time and (viii) update the control graph by creating a new node and a new edge, with updated input values, the moisture value and the goodness value ($\eta$) associated with the edge, wherein the moisture is updated only if an unprocessed row is processed, and wherein the goodness value ($\eta$) is updated when a target row is processed. Further, the one or more hardware processors are configured by the programmed instructions to generate a plurality of test cases by selecting a plurality of paths, wherein each path among the plurality of paths begins at the first node of the control graph and terminates at a node of the control graph, corresponding to process completion of the target row, wherein each of the plurality of test cases includes a plurality of timed input variable pair and a plurality of timed output variable pair.

In yet another aspect, a computer program product including a non-transitory computer-readable medium having embodied therein a computer program for method and system for test case generation for event based systems using graph path traversal is provided. The computer readable program, when executed on a computing device, causes the computing device to receive a plurality of input signals and a plurality of output signals of a system under test, represented as a regular expression corresponding to a plurality of events of the system under test in a tabular format, wherein the tabular format includes a plurality of rows. The computer readable program, when executed on a computing device, causes the computing device to create a plurality of state machines for each of the plurality of regular expressions associated with the tabular format. Further, the computer readable program, when executed on a computing device, causes the computing device to initialize generation of a control graph with a first node for the system under test, wherein the graph is grown by adding a node and an edge when there is a change in an input signal among the plurality of input signals of the tabular format, wherein each edge of the graph is associated with the plurality of input signals, a moisture value and a goodness value ($\eta$). Further, the computer readable program, when executed on a computing device, causes the computing device to grow the control graph until the plurality of rows are processed, where growing the control graph includes: (i) select an unprocessed row among the plurality of rows as a target row based on a distance, wherein the distance is computed based on a weighted sum of a number of transitions required to reach final state in each of the state machine associated with the target row (ii) compute an input value for each non-empty input signal among the plurality of input signals of the target row by querying the plurality of state machines associated with the target row (iii) compute an initial fitness value for each non-empty input signal, wherein the initial fitness value of each non-empty input signal is associated with a plurality of outgoing edges of a current node of the control graph (iv) compute a final fitness value for each non-empty input signal based on the initial fitness value, timing constraints and dependency constraints associated with each of the non-empty input signal (v) select at least one non-local input signal among the plurality of input signals in a probabilistic manner based on the final fitness value, wherein if an input signal among the plurality of input signals is a local input signal, the value of the local input signal is checked for presence in the plurality of output signals of rows other than the target row by recursive backtracking to obtain a non-local input signal (vi) compute a time for the selected non-local input signal based on the timing constraints (vii) execute each state machine of each of the plurality of rows associated with the tabular format based on the value of the selected non-local input signal(s) and the computed time and (viii) update the control graph by creating a new node and a new edge, with updated input values, the moisture value and the goodness value ($\eta$) associated with the edge, wherein the moisture is updated only if an unprocessed row is processed, and wherein the goodness value ($\eta$) is updated when a target row is processed. Finally, the computer readable program, when executed on a computing device, causes the computing device to generate a plurality of test cases by selecting a plurality of paths, wherein each path among the plurality of paths begins at the first node of the control graph and terminates at a node of the control graph, corresponding to process completion of the target row, wherein each of the plurality of test cases includes a plurality of timed input variable pair and a plurality of timed output variable pair.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
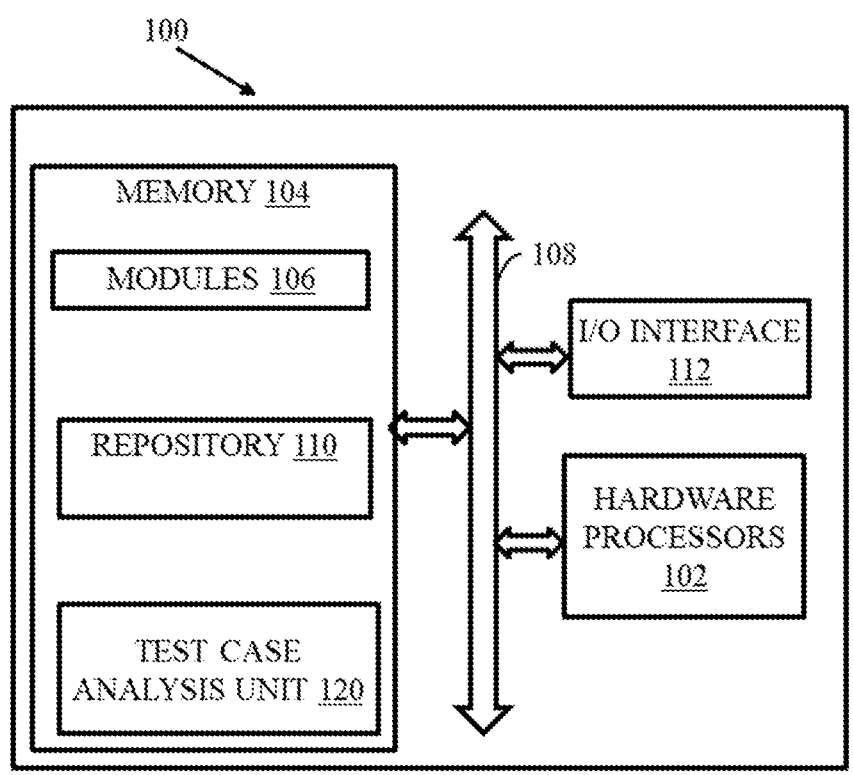
FIG. 1 is a functional block diagram of a system for test case generation for event based systems using graph path traversal, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments herein provide a method and system for test case generation for event based systems using graph path traversal. The system for test case generation for event based systems using graph path traversal can generate a plurality of time bound test cases based on an Artificial Rain Drop (ARD) algorithm. Here, a plurality of events associated with an event based system are compiled in a tabular format. Each of the plurality of events are represented as a regular expression. Further, timed finite automaton is constructed for each regular expression prior to applying the ARD algorithm.

Referring now to the drawings, and more particularly to FIG. 1 through 4, where similar reference characters denote corresponding features consistently throughout the figures, there are shown preferred embodiments and these embodiments are described in the context of the following exemplary system and/or method.

FIG. 1 is a functional block diagram of a system for test case generation for event based systems using graph path traversal, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server.

The one or more hardware processors 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106, a test case analysis unit 120. The memory 104 also includes a repository 110 for storing data processed, received, and generated by one or more of the modules 106 and the test case analysis unit 120. The modules 106 may include routines, programs, objects, components, data structures, and so on, which perform particular tasks or implement particular abstract data types.

The memory 104 also includes module(s) 106 and a data repository 110. The module(s) 106 include programs or coded instructions that supplement applications or functions performed by the system 100 for test case generation for event based systems using graph path traversal. The modules 106, amongst other things, can include routines, programs, objects, components, and data structures, which perform particular tasks or implement particular abstract data types. The modules 106 may also be used as, signal processor(s), state machine(s), logic circuitries, and/or any other device or component that manipulates signals based on operational instructions. Further, the modules 106 can be used by hardware, by computer-readable instructions executed by a processing unit, or by a combination thereof. The modules 106 can include various sub-modules (not shown). The modules 106 may include computer-readable instructions that supplement applications or functions performed by the system 100 for test case generation for event based systems using graph path traversal.

The data repository 110 may include a plurality of input data in tabular format and other data. Further, the other data amongst other things, may serve as a repository for storing data that is processed, received, or generated as a result of the execution of one or more modules in the module(s) 106 and the modules associated with the test case analysis unit 120.

Although the repository 110 is shown internal to the system 100, it will be noted that, in alternate embodiments, the repository 110 can also be implemented external to the computing device 100, where the repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

The test case analysis unit 120, executed by the one or more processors of the system 100, receives a plurality of input signals and a plurality of output signals of a system under test, represented as a regular expression corresponding to a plurality of events of the system under test in a tabular format, wherein the tabular format includes a plurality of rows.

In an embodiment, the tabular format utilized as input in the present disclosure is an Expressive Decision Table (EDT). The EDT includes one or more tables. The column headers specify the names of input and output signal, and the rows specify relationships between patterns of the plurality of input signals and the plurality of output signal values or events. The EDT is easy to understand, use, and formal enough to enable automated test case generation. The EDT specifies both—state based and sequence-based requirements, leading to compact specifications of reactive systems.

An example EDT for an Alarm module of a real world automotive application as depicted in Table 1 is described below:
1) If "Ignition" and "alarm" are Off, and PanicSw is pressed and released twice within 3 seconds, then Alarm should be On for 30 seconds, and Flash should blink 30 times with a gap of 500 milliseconds between each On and Off and should have No Req after that.
2) If Alarm is On and PanicSw is pressed for more than 3 seconds and then released (called as long press), then the Flash should be No Req and Alarm should be Off.
3) If Ignition becomes On, then Flash should be No Req and Alarm should be Off.

TABLE 1

| Sl. No. | input Ignition | input Alarm | input PanicSw | output Alarm | output Flash |
|---|---|---|---|---|---|
| 1 | Off | Off | {{Press; Release}{=2}}{<3 s} | On{=30 s}; Off | {On{=500 ms}; Off{=500 ms}}{=30}; No Req |
| 2 | | On | Press{>3 S}; Release | Off | No_Req |
| 3 | On | | | Off | No_Req |

Table 1 depicts the example EDT described above. Each row of the EDT row maps directly to one of the requirements. The column headers specify three input signals: "Ignition", "PanicSw" and "Alarm", and two output signals: "Flash" and "Alarm". The "Alarm" signal can be an input and an output (I/O) signal. Each event of a particular operation is represented in the form of a regular expression. The regular expression in each input cell of the EDT specifies a sequence of input value(s), matching the requirements of the cell. The regular expression in an output cell specifies the sequence of signal value(s), outputted when the requirements of all the input cells in that row are matched.

For brevity of description, the terms "regular expression" and "pattern" can be used interchangeably. Now referring to Table 1, the pattern "Off" given in the first row for columns corresponding to the signals "Ignition" and "Alarm" matches when the operating environment sends the value "Off" to the system under test. The compactness of EDT is illustrated by the pattern '{{Press;Release}{=2}}{<3s}' which is detected when the values Press followed by Release are received twice within three seconds for the signal PanicSw. The output pattern in the first row corresponding to the signal Flash specifies that the values "On" followed by Off should be output with a gap of 500 milliseconds, and this pattern should be repeated 30 times.

Further, the test case analysis unit 120, executed by the one or more processors of the system 100, creates a plurality of state machines for each of the plurality of regular expressions associated with the tabular format. In an embodiment, the state machine can be a discrete timed automaton corresponding to the regular expression in each cell of the EDT.

Further, the test case analysis unit 120, executed by one or more processors of the system 100, initializes generation of a control graph with a first node for the system under test, wherein the graph is grown by adding a node and an edge when there is a change in an input signal among the plurality if input signals of the tabular format, wherein each edge of the graph is associated with the plurality of input signals, a moisture value and a goodness value ($\eta$).

Further, the test case analysis unit 120, executed by one or more processors of the system 100, selects an unprocessed row among the plurality of rows as a target row based on a distance, wherein the distance is computed based on a weighted sum of a number of transitions required to reach final state in each of the state machine associated with the target row and the formula for calculating the distance is given in equation 1. A probability of selecting an unprocessed row as target row is inversely proportional to the distance associated with the row. The input value for the selected row is computed based on a plurality of features. The plurality of features includes a category of the plurality of input and output signals, timing and dependency constraints associated with the corresponding regular expression and a final fitness associated with the input signal. A row of the tabular format is marked processed when all state machines of the row are in their final state and a test case is generated for the row.

In an embodiment, the ARD algorithm includes a plurality of logical agent components represented as agents or agent. The method of selecting the target row closer to an agent is explained as follows: Each agent $A_i$ starts from $N_1$ and selects a target row based on a distance of that row from current node of $A_i$. For initial iterations, the agent starts from the node $N_1$. Later it starts from any random node, closer to the target. To calculate the distance, transitions of the discrete timed automaton are used. The distance between the current state of agent and the target row is calculated as given in equation 1, as a weighted sum of the number of transitions needed to reach final state in state machine for all inputs and locals.

$$\text{Distance of } A_i \text{ from row}(d) = \Sigma(\text{No. of transitions of inputs } SM) + W \times \Sigma(\text{No. of transitions of local } SM) \quad (1)$$

In an embodiment, a local value cannot be generated on its own like an input and is generated when a row is matched by outputting a corresponding value. As local variables generally requires multiple inputs for taking one transition, the number of transitions needed for locals is multiplied with a constant weight 'W'. The probability of a row being selected as the target is inversely proportional to its distance. Based on the probability, the target is chosen randomly.

In an embodiment, the pseudo code for selecting a target is given below:
SelectTarget( )
∀i: is calcDist($R_i$)
∀i: calculate probability $P_{Ri}$
if ($R_i$) is uncovered
increment $P_{Ri}$
Target T=getClosestTarget($P_{Ri}$[ ])

Further, the test case analysis unit 12, executed by the one or more processors of the system 100, computes an input value for each non-empty input signal among the plurality of input signals of the target row by querying the plurality of state machines associated with the target row.

In an embodiment, the ARD algorithm computes the input value for each non-empty input signal by using the plurality of agents $A_i$, and build the control graph with weighted edges. The ARD further utilizes a plurality of properties including, the distance between nodes or between a node and target. Each node(N) of the control graph is uniquely identified by a tuple containing every input(I) and local(L) signal with its value <<$I_1,V_1$>, <$L_2,V_2$> ... <$I_n,V_n$>>. Default Node $N_i$ includes a plurality of local signal with default values. The local signals appears on both input signal and output signal of an EDT. For example "Alarm" in table 1. They cannot take any value like inputs. The value of local signals are generated by processing some other row that has the said local as output. Further, each node $N_i$ includes an input sequence (Is) to reach $N_i$ from $N_1$ and an array of all outgoing edges(E). The array of outgoing edges are directed and associated with an initial or final fitness value. The edges of the control graph are of two types: (i) Input edges have a variable with its value (Eg–Inp1=On) whereas and (ii) time edges have a time T elapsed in them (Eg-2000 ms passed).

In an embodiment, each agent, generating the input value follows a principle of a raindrop flowing on a glass window. There are two main characteristics of a rain drop. First is, the rain drop tends to take a path having more moist/travelled. Secondly, a less travelled path (having less moisture) evaporates eventually. In the present ARD algorithm, a path is represented by a sequence of edges where each edge $E_i$ is associated with the moisture. An edge having more moisture has more probability of getting selected, thus following the first characteristic of a raindrop. The second characteristic is not followed completely in the present disclosure as the path having less moisture does not evaporate completely. The edges having less moisture is having a low probability of getting selected. The fitness (initial fitness or final fitness) of an edge is calculated based on its moisture and the goodness value eta (n).

In an embodiment, the probability of selecting an input depends on how the input has performed in past iterations and type of operators in the corresponding cell of the EDT. A row may contain inputs as well as local variables. So, if there is a choice between input and local, there is high probability of selecting a local variable is high. Now, referring to the pseudo code in InpGenRDA, each agent covers target rows i.e. generate test cases for target rows. Initially each agent from the plurality if agents is at the default node which has all input and local variables in their default value. Firstly the agent selects a target and secondly, the agent processes the target row for generating the plurality of test cases.

In an embodiment, the pseudo code for InpGenRDA is given below:

```
InpGenRDA( )
    Select target T := getTarget( ) while ( steps ) rn=rand( )
        if(ArrL 6= ø && rn = true)
            selSig := chooseVar(ArrL) else selSig :=
    SelectSignal ( )
        while(selSig is local)
            Rx := getRowGeneratingSelsig( ) selSig :=
    getAnySignalFrmRx( ) insert(ArrL, otherSignalsRx)
            AssignTime(selSig)
            ExpGen( ) BuildGraph( ) steps++
        if(covered(T))
    Inc(M,η) else
    Dec(M,η)
```

In an embodiment, "ArrL" is an array including extra edges, considered as possible candidate of being selected when backtracking is being performed. Each agent flips a coin to select, if any edge from ArrL should be selected or a new edge should be created from the target row. If it decides to select from ArrL and the array is not empty, it will select an edge based on its weightage. Otherwise, it will select a new input from the row by using the method SelectSignal( ).

Further, the test case analysis unit 120, executed by one or more processors of the system 100, computes an initial fitness value for each non-empty input signal, wherein the initial fitness value of each non-empty input signal is associated with a plurality of outgoing edges of a current node of the control graph.

Further, the test case analysis unit 120, executed by one or more processors of the system 100, computes a final fitness value for each non-empty input signal based on the initial fitness value, timing constraints and dependency constraints associated with each of the non-empty input signal.

The fitness value (initial fitness or final fitness) is based on the plurality of parameters including the moisture and the eta (n). Moisture(M) of edge $E_i$ is defined as number of new rows covered by any agent $A_i$ through a path containing $E_i$. The η of edge $E_i$ is a measure of goodness of an edge corresponding to the selected target row. For example, if $A_i$ selects target as row X and while trying to generate test case, it covers new row Y. In this case, the M of edges in this path will be incremented as a new row is covered, but η will not be increased as the target is still uncovered. Fitness of an edge Fe is calculated as Fn(M, η) as give in equation 2.

$$Fn(\ )=((\alpha^*M)+(\beta^*\eta))/\gamma \qquad (2)$$

In an embodiment, the agent Ai first creates a list of all the possible edges need to reach the target. The "fitness" in the explanation can be initial fitness or final fitness. Further, the agent Ai checks for the edges that are already created from the current node. If there are some common edges in both, the agent Ai calculates the fitness of each such edge. Fitness is calculated as a function of its M and n as given in equation 2:

The improved function of equation 2 is given in equation 3.

$$Fn(\ )=((\alpha^*M)+(\beta^*\eta)+(\rho^*mcdcM)+(\sigma^*mcdcEta))/\gamma \qquad (3)$$

where α, β, γ, ρ and σ are constant throughout the experiments and mcdc depicts modified condition decision coverage. The, mean of initial fitness of the existing edges are assigned to as initial fitness of the new edges. After assigning basic fitness to all the edges, the fitness of edges corresponding to the current target row is updated. For example, if input $I_1$ includes "On">=5 s and input 12 includes "On"<2 s in current row. Further, to satisfy the current row, (11="On") should occur before (12="On"). Here, the fitness of $I_1$ will be increased. The probability of selecting the input is directly proportional to its fitness. So, probability of selecting B and $I_1$ will be more than A and $I_2$ the said updating is performed provides the final fitness of all edges.

Further, the test case analysis unit 120, executed by one or more processors of the system 100, selects at least one non-local input signal among the plurality of input signals in a probabilistic manner based on the final fitness value, wherein if an input signal among the plurality of input signals is the local input signal, the value of the local input signal is checked for presence in the plurality of output signals of rows other than the target row by recursive backtracking to obtain a non-local input signal.

In an embodiment, after the final fitness for all edges has been assigned/modified, one or more non-local input signal (selSig) is selected as the next input based on the probabilities. If selSig is a non-local input, ExpGen( ) function is executed. If the selSig a local input signal, backtracking is applied to reach an input signal.

In an embodiment the pseudo code for SelectSignal( ) is given below:

```
SelectSignal( )
allPossEdgeArr := getAllPossibleEdgesForTarget( )
if( allNodeOutEdge ∩ allPossEdge = ø )
    ∀ i: allPossEdge[i]→Fitness := 1
    ∀ i: updateFitness( )
else
    ∀ common edges: allPossEdge[i]→Fitnes := F(M,η)
    ∀ other edges: allPossEdge[i]→Fitnes := mean( F[i])
    ∀ i: changeProb( )
selSig=chooseVar(allPossEdge)
```

Further, the test case analysis unit 120, executed by one or more processors of the system 100, computes a time for the selected non-local input signal(s) based on the time constraints.

Further, the test case analysis unit 120, executed by one or more processors of the system 100, executes each state machine of each of the plurality of rows associated with the tabular format based on the value of the selected non-local input signal(s) and the computed time.

Further, the test case analysis unit 120, executed by one or more processors of the system 100, updates the control graph by creating a new node and a new edge, with updated input values, the moisture value and the goodness value (η) associated with the edge, wherein the moisture is updated only if an unprocessed row is processed, and wherein the goodness value (η) is updated when a target row is processed.

Further, the test case analysis unit 120, executed by one or more processors of the system 100, generates a plurality of test cases by selecting a plurality of paths, wherein each path among the plurality of paths begins at the first node of the control graph and terminates at a node of the control graph, corresponding to process completion of the target row, wherein each of the plurality of test cases includes a plurality of timed input variable pair and a plurality of timed output variable pair.

Figure 2A:
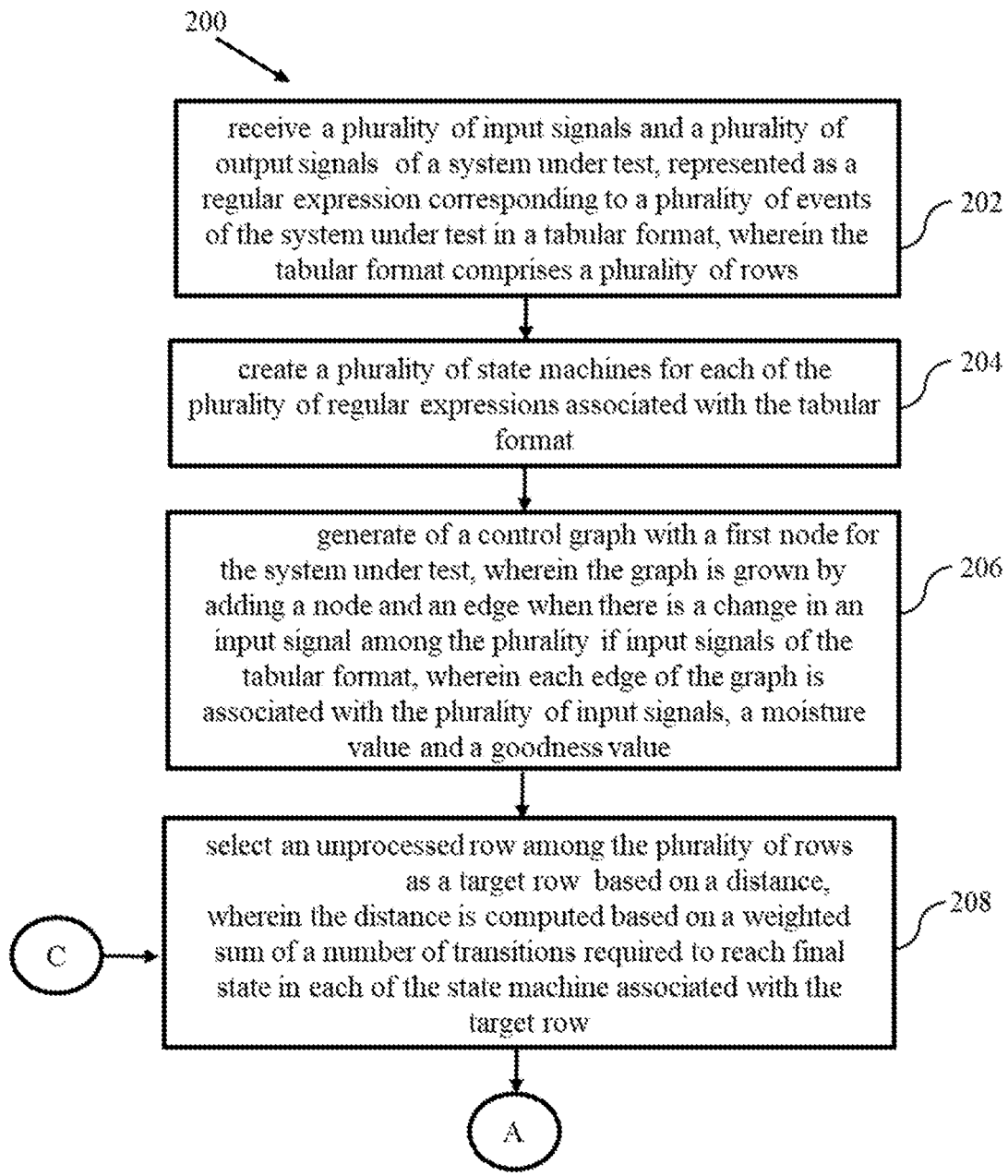
FIGS. 2A, 2B and 2C are exemplary flow diagrams for a processor implemented method for test case generation for event based systems using graph path traversal, according to some embodiments of the present disclosure.
Figure 2B:
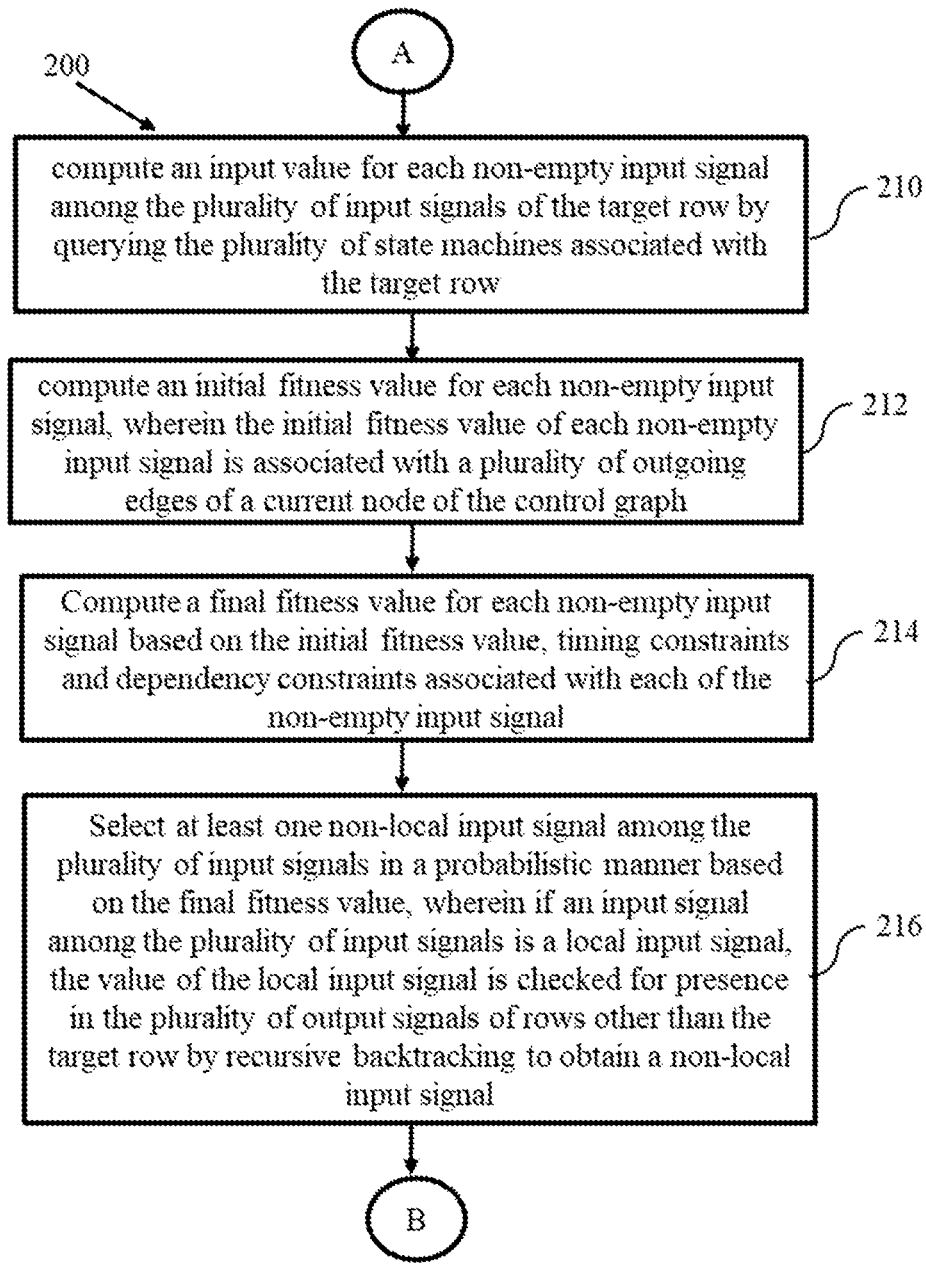
Figure 2C:
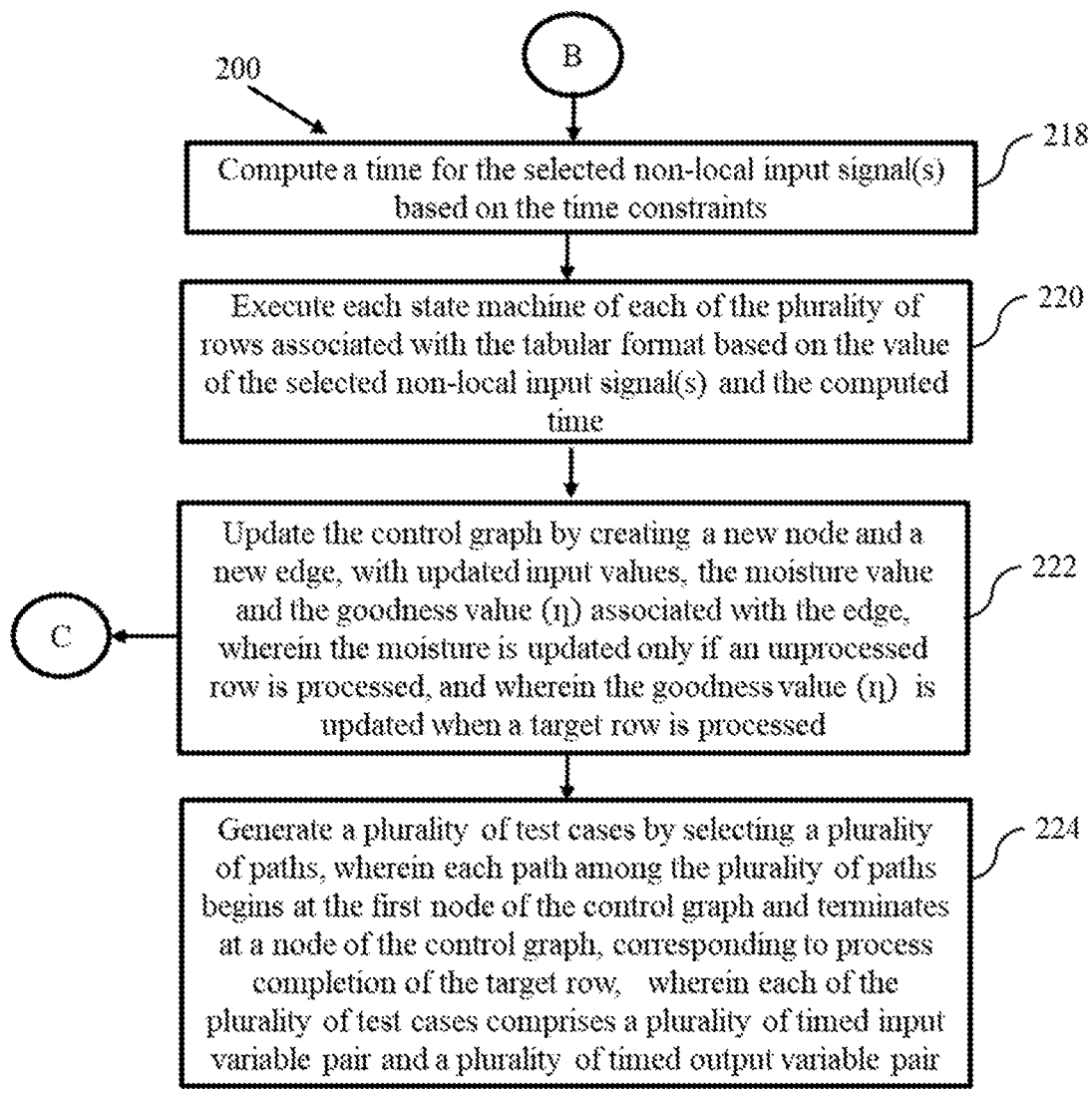

In an embodiment, each of the plurality of test cases includes a timed sequence of input values and corresponding expected output values. Each element of the timed sequence is a tuple of the form (signal_name, value, time, category), wherein, "signal_name" is an input signal, "value" is a valid value for that signal, "time" is the time when the value arrives and "category" indicates whether the signal is an input, output or I/O signal. For example, a test is given as (alarm, Off, 2S, Output), where, "alarm" is the signal_name. "Off" is the signal value, "2S" is the time and "Output" is the signal category FIGS. 2A and 2B are exemplary flow diagrams for a processor implemented method for test case generation for event based systems using graph path traversal, according to some embodiments of the present disclosure. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At 202, the method 200, receives, by a one or more hardware processors, the plurality of input signals and a plurality of output signals of the system under test, represented as the regular expression corresponding to the plurality of events of the system under test in the tabular format, wherein the tabular format includes a plurality of rows.

At 204, the method 200, creates, by a one or more hardware processors, the plurality of state machines for each of the plurality of regular expressions associated with the tabular format.

At 206, the method 200, initializes, by a one or more hardware processors, generation of the control graph with the first node for the system under test, wherein the graph is grown by adding a node and an edge when there is a change in an input signal among the plurality of input signals of the tabular format, wherein each edge of the graph is associated with the plurality of input signals, the moisture value and the goodness value (η). Growing the control graph until the plurality of rows are processed, where growing the control graph includes the steps from 208 to 222. At 208, the method 200, selects, by a one or more hardware processors, an unprocessed row among the plurality of rows as a target row based on the distance, wherein the distance is computed based on a weighted sum of a number of transitions required to reach final state in each of the state machine associated with the target row.

At 210, the method 200, computes, by a one or more hardware processors, the input value for each non-empty input signal among the plurality of input signals of the target row by querying the plurality of state machines associated with the target row. The input value is computed based on a plurality of features, wherein the plurality of features includes a category of the plurality of input and output signals, timing constraints and dependency constraints associated with the corresponding regular expression and a final fitness associated with the input signal.

At 212, the method 200, computes, by a one or more hardware processors, the initial fitness value for each non-empty input signal, wherein the initial fitness value of each non-empty input signal is associated with a plurality of outgoing edges of a current node of the control graph.

At 214, the method 200, computes, by a one or more hardware processors, the final fitness value for each non-empty input signal based on the initial fitness value, timing constraints and dependency constraints associated with each of the non-empty input signal.

At 216, the method 200, selects, by a one or more hardware processors, at least one non-local input signal among the plurality of input signals in a probabilistic manner based on the final fitness value, wherein if an input signal among the plurality of input signals is a local input signal, the value of the local input signal is checked for presence in the plurality of output signals of rows other than the target row by recursive backtracking to obtain a non-local input signal.

At 218, the method 200, computes, by a one or more hardware processors, computes the time for the selected non-local input signal(s) based on the time constraints.

At 220, the method 200, executes, by a one or more hardware processors, each state machine of each of the plurality of rows associated with the tabular format based on the value of the selected non-local input signal(s) and the computed time.

At 222, the method 200, updates, by a one or more hardware processors, updating the control graph by creating a new node and a new edge, with updated input values, the moisture value and the goodness value (q) associated with the edge, wherein the moisture is updated only if an unprocessed row is processed, and wherein the goodness value (η) is updated when a target row is processed.

At 224, the method 200, generates, by a one or more hardware processors, the plurality of test cases by selecting a plurality of paths, wherein each path among the plurality of paths begins at the first node of the control graph and terminates at a node of the control graph, corresponding to process completion of the target row, wherein each of the plurality of test cases includes a plurality of timed input variable pair and a plurality of timed output variable pair.

TABLE 2

| SNO | IN X | A | B | OUT (Output) | X |
|---|---|---|---|---|---|
| 1 | S0 | On | | | S1 |
| 2 | S1{<4 s} | Off | Off | | |
| | | | On | REQ | S2 |
| 3 | S1 {>4 s} | | | NO_ REQ | S0 |
| 4 | S1 | | | | |
| | | | On | NO_ REQ | S0 |

Figure 3:
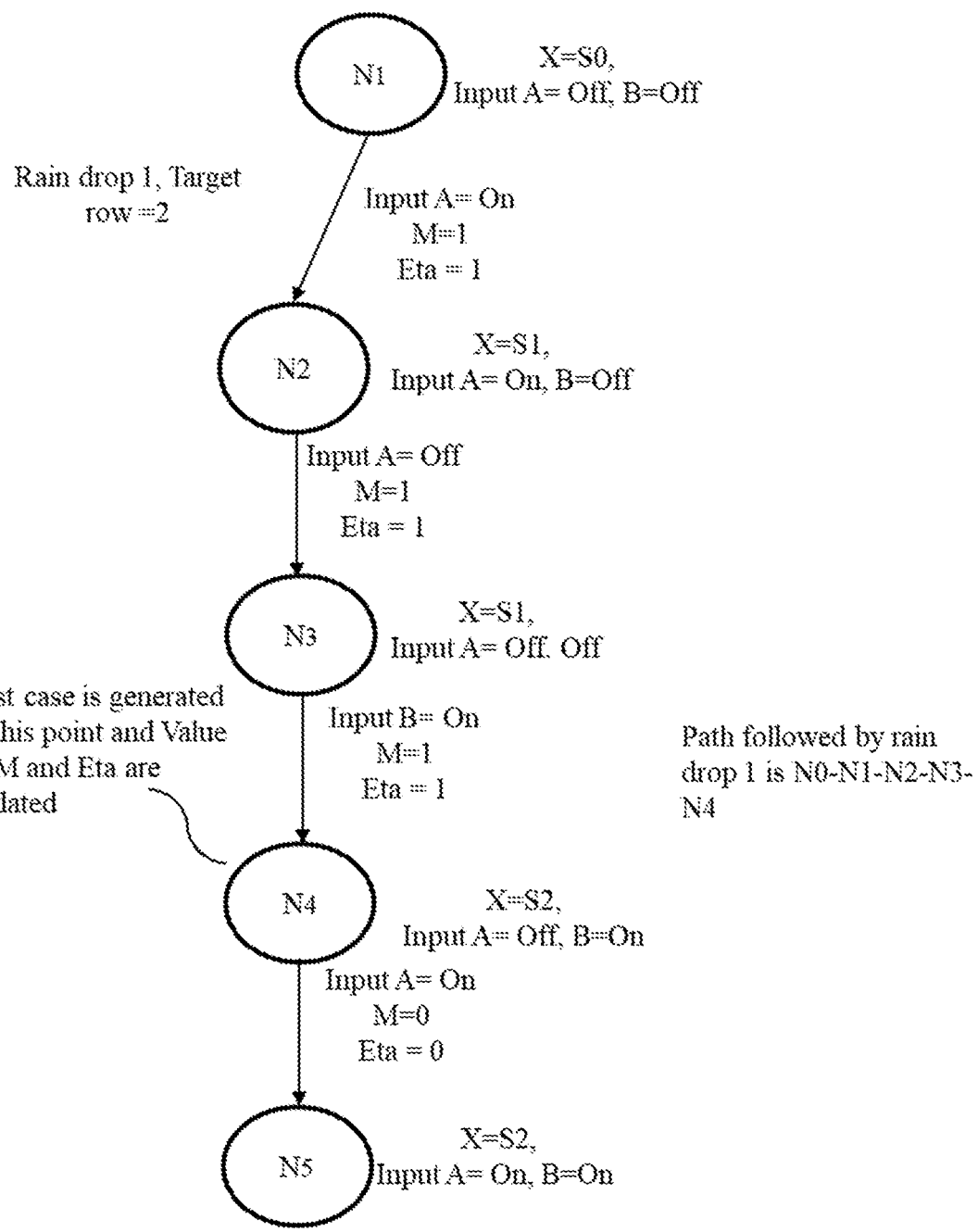
FIG. 3 and FIG. 4 are exemplary control graphs for a method for test case generation for event based systems using graph path traversal, according to some embodiments of the present disclosure
Figure 4:
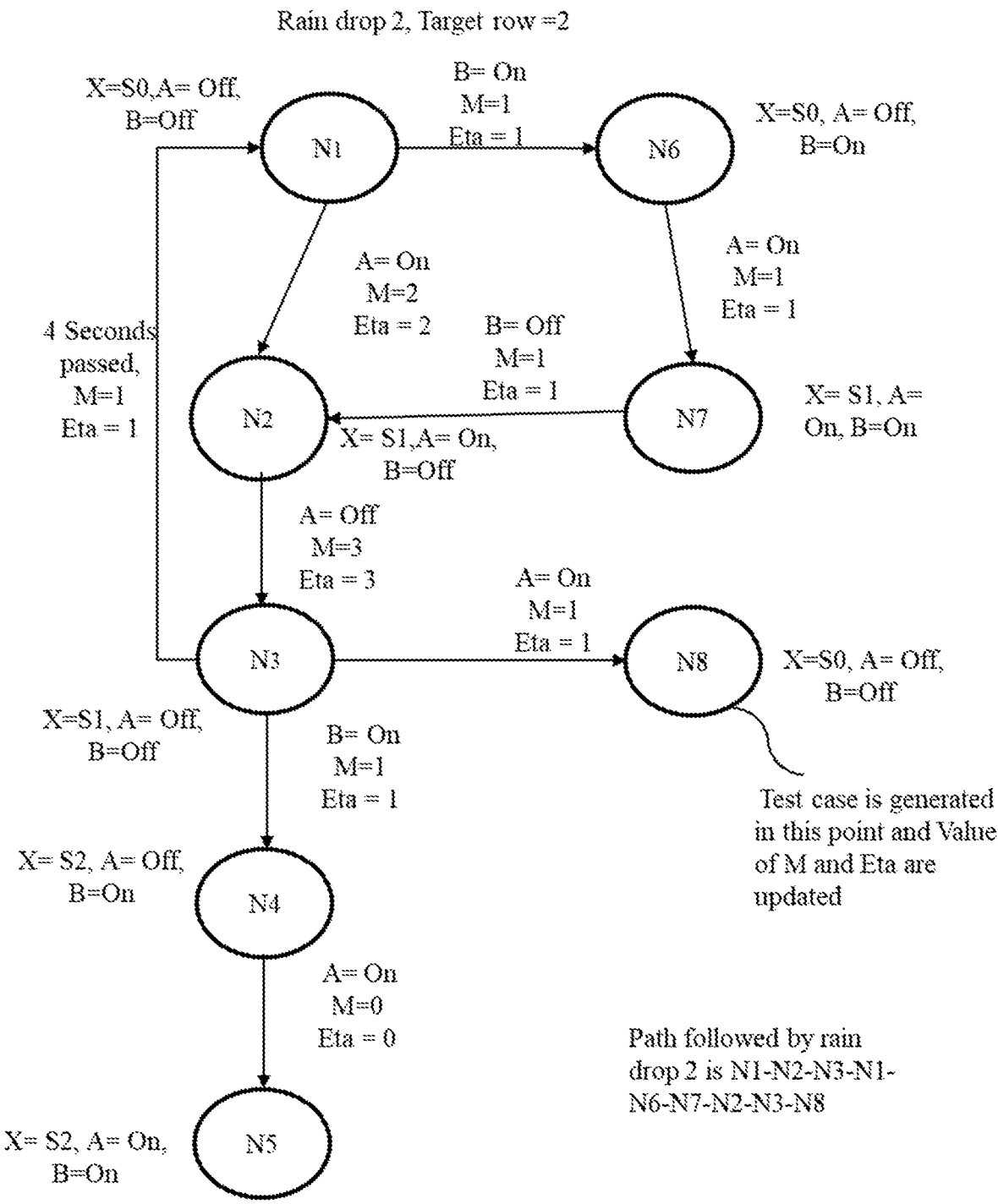

FIG. 3 and FIG. 4 are exemplary control graphs for the method for test case generation for event based systems using graph path traversal, according to some embodiments of the present disclosure. Now referring to FIG. 3, execution of a rain drop 1 corresponding to Table 2 is explained (drop 1 indicates a first iteration for generating a first test case). Here, N1 is the default node where every signal (input signal and local signal) is in default value. Initially, there is no edge in the graph. For example, if the selected target row is row 2 and Input is "A=On", an edge is created from N1. Initial value of the moisture (M) and eta is zero and the said values are provided as input to ExpGen( ) and state machines of the EDT are executed. The local variable X and outputs are updated if any. A destination node N2 is also created along with edge. Similarly, an edge with input "A=Off" is created from node N2 to node N3, an edge "B=On" is created from N3 to N4 and an edge "A=On" is created from N4 to N5. Here, the target row 2 is covered after processing input "B=On" when node N4 is created. Since row 2 is uncovered, M of path traversed till N4 is incremented. Further, since row 2 is the target row, eta of path traversed till N4 is incremented. So, M and Eta of edges in path N1→N2→N3→N4 are incremented from 0 to 1. M and Eta of edge from N4 to N5 remains zero as it did not contribute to the covering of row 2. Following test case depicted in Table 3 is generated for this path (N1 to N4).

TABLE 3

| Time | Input | Output |
|---|---|---|
| 100 | A = On | |
| 200 | A = Off | |
| 300 | B = On | |
| | | REQ |

Now referring to FIG. 4, execution of a rain drop 2 corresponding to Table 2 is explained (drop 2 indicates a second iteration for generating a second test case), drop 2 starts its process after drop 1 has completed till node N5. Drop 2 also starts from default node N1. Here, the target is row 4. For example, if input "A=On" and since edge for the input "A=On" already exists, no edge is created again. The drop 2 traverses the existing edge and reaches the node N2. Further, if "A=Off" is selected and then the drop 2 reaches the node N2. From N2, if a time elapse of 4 seconds happens, the drop takes a step and local variable X gets a value S0, and the drop 2 go back to node N1. From N1, if input "B=On" is selected, a new edge N6 is created. Similarly, node N7 is created and reaches the node N2, and further to node N3. From N3, there are two outgoing edges: "B=On" and time elapse "t>4". The drop 2 has a choice of either taking any of the existing edge or create a new edge. In such situation, at every node, the drop 2 queries state machines to get a list of all the inputs necessary to cover the target row. If some inputs on the list are already present in outgoing edges of current node, the drop 2 calculates the fitness of the existing edges. If total of 'n' inputs are needed from current node to cover target row and x inputs are already present in outgoing edges of the node, then for remaining y inputs (where y=n−x), initial fitness is assigned as mean of initial fitness of x edges. Further, initial fitness is updated to get final fitness for all edges based on time constraints in rows. Based on the final fitness, an input is selected in a probabilistic way (More the fitness, more are chances to get selected). Further, the drop 2 selects the input "A=On" and create its edge and new node N8. At node N8, target row is covered and test case is generated for it. Again M and eta will be incremented. Edges between path N1→N2→N3→N4 are already having M and eta as 1 due to drop 1. So now, their eta and M will become 2. Here, the edge "A=Off" from N2 to N3 is traversed twice in path of drop 2, so its M and eta will be incremented twice. So, the M and eta is 3 for N2 and N3. The test case generated by the drop 2 by following the path N1-N2-N3-N1-N6-N7-N2-N3-N8 is depicted in Table 4.

TABLE 4

| Time | Input | Output |
|---|---|---|
| 100 | A = On | |
| 200 | A = Off | |
| 401 | B = On | |
| | | X = S0 |
| | | Output = NO_REQ |
| 5000 | A = On | |
| | | X = S1 |
| 5100 | B = Off | |
| 5200 | A = Off | |
| 5400 | A = On | |
| | | X = S0 |
| | | Output = NO_REQ |

In an embodiment, the system 100 is experimented on a plurality of applications of various domain and the results of experimentation is depicted in Table III as follows: The table 5 depicts the number of rows associated with each experiment, the corresponding percentage of row coverage and, the execution time (time). The rows 1, 2 and 3 depicts the experimentation in automotive domain. The $4^{th}$, $5^{th}$ and $6^{th}$ rows depicts the experimentation on medical domain. The $7^{th}$, $8^{th}$ and $9^{th}$ rows depicts the experimentation on insurance domain.

TABLE 5

| Case Study | Name | Total Rows | Percentage of row coverage | Time in seconds |
|---|---|---|---|---|
| 1 | Speed Alert | 255 | 97.25 | 1209.3 |
| 2 | ORVM (Outer Rear View Mirror) | 80 | 100 | 65.84 |
| 3 | Seat belt | 42 | 100 | 213.34 |
| 4 | Med login | 46 | 100 | 9.16 |
| 5 | Med admin | 77 | 100 | 13.85 |
| 6 | Med Patient | 125 | 96.8 | 80.48 |
| 7 | INS easy | 701 | 75.32 | 7240 |
| 8 | INS NBAPI | 69 | 100 | 6.31 |
| 9 | INS PBC | 58 | 89.66 | 303.84 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of generating the plurality of test cases for complex domains. Here, the system 100 utilizes the ARD algorithm to generate the plurality of test cases. Further, the system 100 can be applied to any kind of domain and scalable.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, the method comprising:

receiving, by one or more hardware processors, a plurality of input signals and a plurality of output signals of a system under test, represented as a regular expression corresponding to a plurality of events of the system under test in a tabular format, wherein the tabular format comprises a plurality of rows;

creating, by the one or more hardware processors, a plurality of state machines for each of the plurality of regular expressions associated with the tabular format;

initializing, by the one or more hardware processors, generation of a control graph with a first node for the system under test, wherein the graph is grown by adding a node and an edge when there is a change in an input signal among the plurality of input signals of the tabular format, wherein each edge of the graph is associated with the plurality of input signals, a moisture value and a goodness value ($\eta$);

growing, by the one or more hardware processors, the control graph until the plurality of rows are processed, where growing the control graph comprises:

selecting, by the one or more hardware processors, an unprocessed row among the plurality of rows as a target row based on a distance, wherein the distance is computed based on a weighted sum of a number of transitions required to reach final state in each of the state machine associated with the target row;

computing, by the one or more hardware processors, an input value for each non-empty input signal among the plurality of input signals of the target row by querying the plurality of state machines associated with the target row;

computing, by the one or more hardware processors, an initial fitness value for each non-empty input signal, wherein the initial fitness value of each non-empty input signal is associated with a plurality of outgoing edges of a current node of the control graph;

computing, by the one or more hardware processors, a final fitness value for each non-empty input signal based on the initial fitness value, timing constraints and dependency constraints associated with each of the non-empty input signal;

selecting, by the one or more hardware processors, at least one non-local input signal among the plurality of input signals in a probabilistic manner based on the final fitness value, wherein if an input signal among the plurality of input signals is a local input signal, the value of the local input signal is checked for presence in the plurality of output signals of rows other than the target row by recursive backtracking to obtain a non-local input signal;

computing, by the one or more hardware processors, a time for the selected non-local input signal based on the timing constraints;

executing, by the one or more hardware processors, each state machine of each of the plurality of rows associated with the tabular format based on the value of the selected non-local input signal(s) and the computed time;

updating, by the one or more hardware processors, the control graph by creating a new node and a new edge, with updated input values, the moisture value and the goodness value ($\eta$) associated with the edge, wherein the moisture is updated only if an unprocessed row is processed, and wherein the goodness value ($\eta$) is updated when a target row is processed; and generating, by the one or more hardware processors, a plurality of test cases by selecting a plurality of paths, wherein each path among the plurality of paths begins at the first node of the control graph and terminates at a node of the control graph, corresponding to process completion of the target row, wherein each of the plurality of test cases comprises a plurality of timed input variable pair and a plurality of timed output variable pair.

2. The processor implemented method of claim 1, wherein the input value is computed based on a plurality of features, wherein the plurality of features comprises a category of the plurality of input and output signals, timing constraints and dependency constraints associated with the corresponding regular expression and a final fitness associated with the input signal.

3. A system comprising:
at least one memory storing programmed instructions; one or more Input/Output (I/O) interfaces; and one or more hardware processors operatively coupled to the at least one memory, wherein the one or more hardware processors are configured by the programmed instructions to:
receive a plurality of input signals and a plurality of output signals of a system under test, represented as a regular expression corresponding to a plurality of events of the system under test in a tabular format, wherein the tabular format comprises a plurality of rows;

create a plurality of state machines for each of the plurality of regular expressions associated with the tabular format;

initialize generation of a control graph with a first node for the system under test, wherein the graph is grown by adding a node and an edge when there is a change in an input signal among the plurality of input signals of the tabular format, wherein each edge of the graph is associated with the plurality of input signals, a moisture value and a goodness value ($\eta$);

grow the control graph until the plurality of rows are processed, where growing the control graph comprises:
select an unprocessed row among the plurality of rows as a target row based on a distance, wherein the distance is computed based on a weighted sum of a number of transitions required to reach final state in each of the state machine associated with the target row;

compute an input value for each non-empty input signal among the plurality of input signals of the target row by querying the plurality of state machines associated with the target row;

compute an initial fitness value for each non-empty input signal, wherein the initial fitness value of each non-empty input signal is associated with a plurality of outgoing edges of a current node of the control graph;

compute a final fitness value for each non-empty input signal based on the initial fitness value, timing constraints and dependency constraints associated with each of the non-empty input signal;

select at least one non-local input signal among the plurality of input signals in a probabilistic manner based on the final fitness value, wherein if an input signal among the plurality of input signals is a local input signal, the value of the local input signal is checked for presence in the plurality of output signals of rows other than the target row by recursive backtracking to obtain a non-local input signal;

compute a time for the selected non-local input signal based on the timing constraints;

execute each state machine of each of the plurality of rows associated with the tabular format based on the value of the selected non-local input signal(s) and the computed time;

update the control graph by creating a new node and a new edge, with updated input values, the moisture value and the goodness value ($\eta$) associated with the edge, wherein the moisture is updated only if an unprocessed row is processed, and wherein the goodness value ($\eta$) is updated when a target row is processed; and generate a plurality of test cases by selecting a plurality of paths, wherein each path among the plurality of paths begins at the first node of the control graph and terminates at a node of the control graph, corresponding to process completion of the target row, wherein each of the plurality of test cases comprises a plurality of timed input variable pair and a plurality of timed output variable pair.

4. The system of claim 3, wherein the input value is computed based on a plurality of features, wherein the plurality of features comprises a category of the plurality of input and output signals, timing constraints and dependency constraints associated with the corresponding regular expression and a final fitness associated with the input signal.

5. One or more non-transitory machine readable information storage mediums comprising one or more instructions which when executed by one or more hardware processors causes:

receiving, by one or more hardware processors, a plurality of input signals and a plurality of output signals of a system under test, represented as a regular expression corresponding to a plurality of events of the system under test in a tabular format, wherein the tabular format comprises a plurality of rows;

creating, by the one or more hardware processors, a plurality of state machines for each of the plurality of regular expressions associated with the tabular format;

initializing, by the one or more hardware processors, generation of a control graph with a first node for the system under test, wherein the graph is grown by adding a node and an edge when there is a change in an input signal among the plurality of input signals of the tabular format, wherein each edge of the graph is associated with the plurality of input signals, a moisture value and a goodness value ($\eta$);

growing, by the one or more hardware processors, the control graph until the plurality of rows are processed, where growing the control graph comprises:

selecting, by the one or more hardware processors, an unprocessed row among the plurality of rows as a target row based on a distance, wherein the distance is computed based on a weighted sum of a number of transitions required to reach final state in each of the state machine associated with the target row;

computing, by the one or more hardware processors, an input value for each non-empty input signal among the plurality of input signals of the target row by querying the plurality of state machines associated with the target row;

computing, by the one or more hardware processors, an initial fitness value for each non-empty input signal, wherein the initial fitness value of each non-empty input signal is associated with a plurality of outgoing edges of a current node of the control graph;

computing, by the one or more hardware processors, a final fitness value for each non-empty input signal based on the initial fitness value, timing constraints and dependency constraints associated with each of the non-empty input signal;

selecting, by the one or more hardware processors, at least one non-local input signal among the plurality of input signals in a probabilistic manner based on the final fitness value, wherein if an input signal among the plurality of input signals is a local input signal, the value of the local input signal is checked for presence in the plurality of output signals of rows other than the target row by recursive backtracking to obtain a non-local input signal;

computing, by the one or more hardware processors, a time for the selected non-local input signal based on the timing constraints;

executing, by the one or more hardware processors, each state machine of each of the plurality of rows associated with the tabular format based on the value of the selected non-local input signal(s) and the computed time;

updating, by the one or more hardware processors, the control graph by creating a new node and a new edge, with updated input values, the moisture value and the goodness value ($\eta$) associated with the edge, wherein the moisture is updated only if an unprocessed row is processed, and wherein the goodness value ($\eta$) is updated when a target row is processed; and generating, by the one or more hardware processors, a plurality of test cases by selecting a plurality of paths, wherein each path among the plurality of paths begins at the first node of the control graph and terminates at a node of the control graph, corresponding to process completion of the target row, wherein each of the plurality of test cases comprises a plurality of timed input variable pair and a plurality of timed output variable pair.

* * * * *